United States Patent Office 2,706,871
Patented Apr. 26, 1955

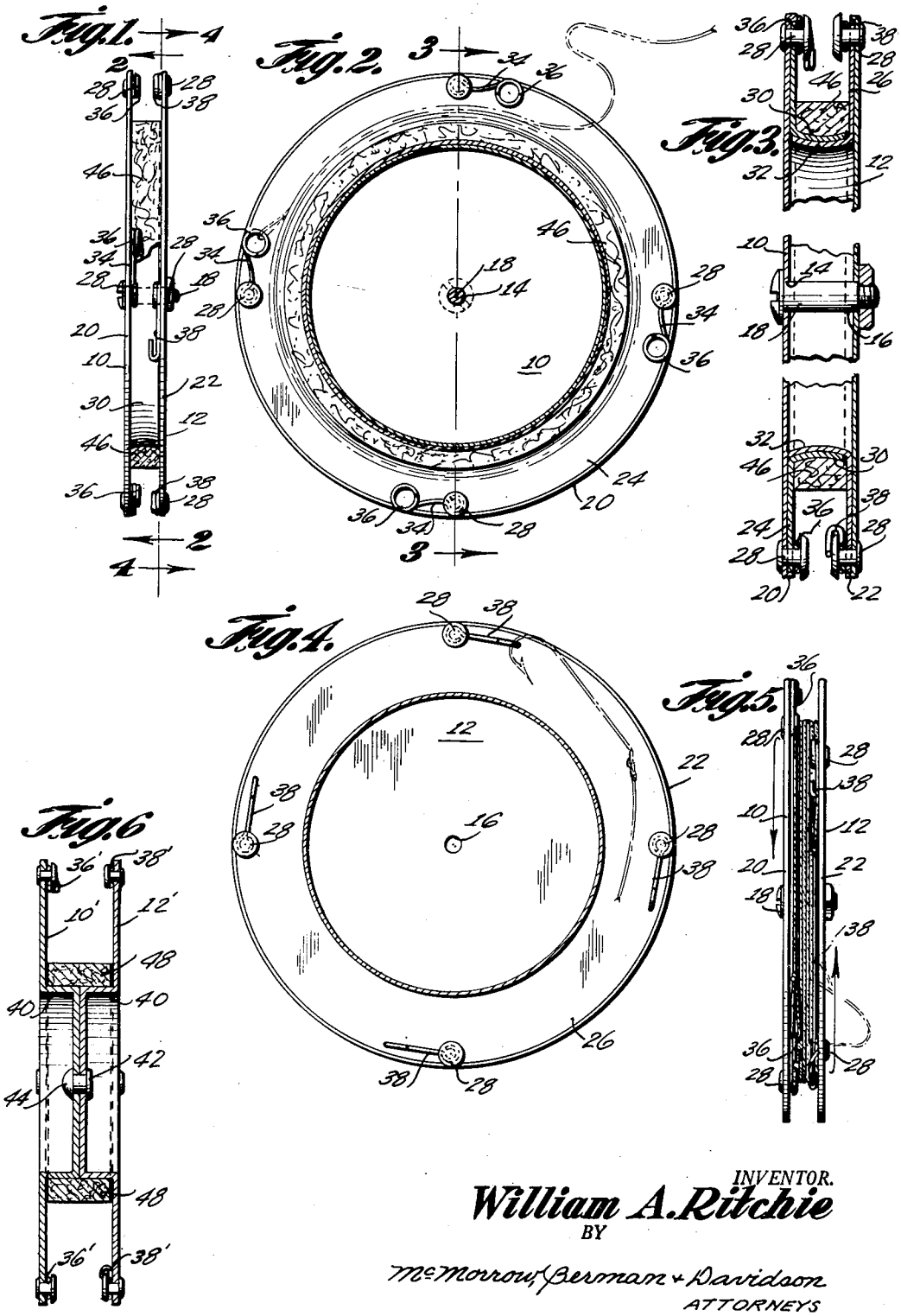

2,706,871

REEL FOR SUPPORTING AND HUMIDIFYING FISHING LEADERS AND HOLDING LEADER MATERIAL

William A. Ritchie, Plainfield, N. J.

Application April 6, 1954, Serial No. 421,260

3 Claims. (Cl. 43—57.5)

This invention relates to a reel for supporting and humidifying fishing leaders and has for its primary object to facilitate the transportation and handling of fishing leaders while preserving them in a flexible state ready for instant use.

Another object is to facilitate the rapid connecting and disconnecting the leaders to the reel.

The above and other objects may be attained by employing this invention which embodies among its features a pair of spaced disks mounted for relative rotation about a common axis, a circular pad of moisture diffusing material mounted between the disks and having its periphery disposed in concentric spaced relation to said common axis, an annular row of circumferentially spaced leader retaining eyes carried by one of said disks and extending inwardly therefrom adjacent the periphery thereof, and an annular row of circumferentially spaced hooks carried by the disk and extending parallel thereto adjacent the periphery thereof for engagement by fish hooks carried by the leaders engaged in the eyes.

Other features include annular reinforcing and stiffening walls engaging the inner faces of the disks adjacent the flanges on the disks, interengaging transversely curved annular stiffening flanges carried by the walls and extending inwardly therefrom in concentric spaced relation to the axis, a circular pad of moisture diffusing material encircling the stiffening flanges, annular rows of circumferentially spaced rivets extending through the disks and stiffening walls adjacent the peripheries thereof for securing the walls to the disks, leader receiving and retaining eyes carried by the rivets carried by one disk and extending parallel thereto adjacent the adjacent reinforcing stiffening wall, and hooks carried by the rivets of the other disk and extending parallel thereto adjacent the adjacent reinforcing and stiffening wall for engagement by fish hooks carried by the leaders engaged in the eyes.

In the drawings:

Figure 1 is an edge view of a fishing leader supporting and humidifying reel embodying the features of this invention;

Figure 2 is a sectional view taken substantially on the line 2—2 of Figure 1;

Figure 3 is a fragmentary enlarged sectional view taken substantially on the line 3—3 of Figure 2;

Figure 4 is a sectional view taken substantially on the line 4—4 of Figure 1;

Figure 5 is a view similar to Figure 1, showing the leaders wound on the reel; and Figure 6 is a fragmentary enlarged sectional view through a modified form of the invention.

Referring to the drawings in detail and particularly Figs. 1 to 5 inclusive, a pair of disks 10 and 12 have openings 14 and 16 extending axially therethrough for the reception of a tie bolt 18 by means of which the disks 10 and 12 are held against relative outward movement. Carried by the peripheries of the disks 10 and 12 and extending inwardly therefrom are flanges 20 and 22, respectively, against which lie the annular reinforcing and stiffening walls 24 and 26. The flanges 20 and 22, and the reinforcing and stiffening walls 24 and 26 are provided adjacent their peripheries with mating openings for the reception of tubular rivets 28 which serve to secure the flanges and walls together adjacent their peripheries. Carried by the stiffening wall 24 and extending transversely between the disks 10 and 12 is a transversely curved annular reinforcing flange 30 which extends across the space between the disks 10 and 12, and a similar transversely curved reinforcing flange 32 is carried by the reinforcing and stiffening wall 26 and extends transversely across the reel adjacent and in contact with the flange 30, previously mentioned.

Carried by the annular row of rivets 28 carried by the disk 10 are shanks 34 of an annular row of circumferentially spaced eyes 36 in which portions of the leaders mounted on the reel are received and clamped. Hooks 38 are carried by the rivets 28 and extend laterally from the rivets 28 in parallel relation to the disk 12.

In the modified form of the invention illustrated in Figure 6, spaced disks 10' and 12', respectively, are provided with inwardly offset cup-shaped hub members 40 which are provided with axially aligned openings 42 in which a rivet 44 is received and set. The disks 10' and 12' are provided respectively with eyes 36' and hooks 38' adjacent their respective peripheries for use in retaining the leaders and fish hooks in place on the reel.

An annular pad 46 encircles the flanges 30 and 32 and is adapted to be saturated with water so that moisture is diffused therefrom through normal evaporation and impregnates the leaders which are stored on the reel. A similar annular pad 48 is carried by the hub 40, previously described, and it will thus be seen that the leader material and leaders carried by the reel will be humidified by evaporation of the moisture from the pads 46 and 48, according to which reel is in use. With the pad 46 or 48 properly moistened, it will be evident that leaders properly engaged in the eyes 36 may be wound upon the pads and the ends of the leaders will be engaged in their respective hooks 38. Obviously, upon rotating the disks relative to one another, the leaders may be tightened in place so as to avoid possibility of dislodgment. When it is time to employ one or more of the leaders, the tension thereon is relieved by turning the disks relative to one another in a direction to loosen the tension on the leaders to a degree sufficient to permit disengagement of a fish hook from its resting place in a hook 38 so that the leader to which the fish hook is attached may be unwound from the reel and attached to a fishing line ready for use. Obviously, because of the moistening of the pad 46 or 48, the leaders wound on either form of the invention will remain in pliable condition.

While in the foregoing there has been shown and described the preferred embodiment of this invention, it is to be understood that minor changes in the details of construction, combination and arrangement of parts may be resorted to without departing from the spirit and scope of the invention as claimed.

What is claimed is:

1. A reel for supporting and humidifying fishing leaders, said reel comprising a pair of spaced disks mounted for relative rotation about a common axis, a circular pad of moisture diffusing material mounted between the disks and having its periphery disposed in concentric spaced relation to said common axis, an annular row of circumferentially spaced leader retaining eyes carried by one of said disks and extending inwardly therefrom adjacent the periphery thereof, and an annular row of circumferentially spaced hooks carried by the other disks and extending parallel thereto adjacent the periphery thereof for engagement by fish hooks carried by leaders engaged in the eyes.

2. A reel for supporting and humidifying fishing leaders, said reel comprising a pair of spaced disks mounted for rotation about a common axis, annular flanges carried by the disks and extending inwardly therefrom between the common axis and the peripheries of the disks, a circular pad of moisture diffusing material encircling the flanges in spaced concentric relation to the peripheries of the disks, an annular row of circumferentially spaced leader retaining eyes carried by one of the disks and extending inwardly therefrom adjacent the periphery thereof, and an annular row of circumferentially spaced hooks carried by the other disk and extending parallel thereto adjacent the periphery thereof for engagement by fish hooks carried by leaders engaged in the eyes.

3. A reel for supporting and humidifying fishing leaders, said reel comprising a pair of spaced disks mounted for relative rotation about a common axis, annular flanges carried by the disks and extending inwardly therefrom adjacent the peripheries thereof, annular reinforcing and stiffening walls engaging the inner faces of the disks adjacent the flanges on the disks, interengaging transversely curved annular stiffening flanges carried by the walls and extending inwardly therefrom in concentric spaced relation to the axis, a circular pad of moisture diffusing material encircling the stiffening flanges, annular rows of circumferentially spaced rivets extending through the disks and stiffening walls adjacent the peripheries thereof for securing the walls to the disks, leader receiving and retaining eyes carried by the rivets carried by one disk and extending parallel thereto adjacent the adjacent reinforcing stiffening wall, and hooks carried by the rivets of the other disk and extending parallel thereto adjacent the adjacent reinforcing and stiffening wall for engagement by fish hooks carried by the leaders engaged in the eyes.

No references cited.